(12) United States Patent
Greene

(10) Patent No.: US 10,103,931 B2
(45) Date of Patent: Oct. 16, 2018

(54) SESSION-BASED MATCHING OF MUTABLE BROWSER IDENTIFIERS

(71) Applicant: Parrable Inc., New York, NY (US)

(72) Inventor: Justin E. Greene, New York, NY (US)

(73) Assignee: Parrable Inc., New York, NY (US)

( * ) Notice: Subject to any disclaimer, the term of this patent is extended or adjusted under 35 U.S.C. 154(b) by 248 days.

(21) Appl. No.: 14/861,097

(22) Filed: Sep. 22, 2015

(65) Prior Publication Data
US 2017/0085412 A1    Mar. 23, 2017

(51) Int. Cl.
| | | |
|---|---|---|
| *H04L 12/24* | (2006.01) | |
| *G06F 17/30* | (2006.01) | |
| *H04L 29/08* | (2006.01) | |
| *H04L 29/12* | (2006.01) | |
| *G06F 21/62* | (2013.01) | |

(52) U.S. Cl.
CPC .... *H04L 41/0293* (2013.01); *G06F 17/30876* (2013.01); *G06F 17/30902* (2013.01); *H04L 41/0266* (2013.01); *H04L 61/1547* (2013.01); *H04L 61/609* (2013.01); *H04L 67/02* (2013.01); *H04L 67/06* (2013.01); *H04L 67/18* (2013.01); *G06F 21/6263* (2013.01)

(58) Field of Classification Search
CPC ................. H04L 67/02; H04L 41/0266; G06F 17/30876; G06F 17/30902
See application file for complete search history.

(56) References Cited

U.S. PATENT DOCUMENTS

| 7,873,734 B1 * | 1/2011 | Eidelman ................ H04L 67/02 709/203 |
|---|---|---|
| 8,930,437 B2 | 1/2015 | Ball et al. |
| 9,232,014 B2 * | 1/2016 | Duterque ........... G06Q 30/0201 |

(Continued)

FOREIGN PATENT DOCUMENTS

WO    WO 2017/053538    3/2017

OTHER PUBLICATIONS

PCT Application PCT/US2016/053061 International Search Report and Written Opinion dated Dec. 2, 2016.

*Primary Examiner* — Chirag R Patel
(74) *Attorney, Agent, or Firm* — Polsinelli LLP

(57) ABSTRACT

Systems and methods for session-based matching of mutable browser identifiers are provided. Information may be stored regarding a plurality of mutable browser identifiers each unique to an associated website and one or more maps each associating a immutable browser identifier to one or more mutable browser identifiers. Such a immutable browser identifier may be unique to an associated browser. Further, information may be received from a computing device that has used a browser to download a website. Such downloaded website may include a reference to a mutable browser identifier specific to the downloaded website. The referenced mutable browser identifier may be identified as corresponding to one of the stored mutable browser identifiers. The session information of the referenced mutable browser identifier in the received information may be compared to the session information of the corresponding stored mutable browser identifier. Stored information associated with the corresponding stored mutable browser identifier may be updated based on the comparison.

21 Claims, 3 Drawing Sheets

(56) References Cited

U.S. PATENT DOCUMENTS

2006/0031442 A1* 2/2006 Ashley .................... H04L 67/14
709/223
2008/0320075 A1 12/2008 Livshits et al.
2011/0185016 A1* 7/2011 Kandasamy ........... G06Q 10/06
709/203
2014/0257999 A1 9/2014 Garcia-Martinez

* cited by examiner

SESSION-BASED MATCHING OF MUTABLE BROWSER IDENTIFIERS

CROSS-REFERENCE TO RELATED APPLICATIONS

The present patent application is related to co-pending U.S. patent application Ser. No. 14/716,187 filed May 19, 2015 and titled "Unique Identifiers for Browsers" and co-pending U.S. patent application Ser. No. 14/861,993 filed concurrently herewith and titled "Timestamp-Based Matching of Identifiers," the disclosures of which are incorporated by reference herein.

BACKGROUND

Field of the Invention

The present invention generally relates to browsers. More specifically, the present invention relates to session-based matching of mutable browser identifiers.

Description of the Related Art

The use of Internet and web resources is nearly ubiquitous throughout the industrialized world. Users generally access the Internet using any of a number of computing devices capable of communicating over a communication network, whether wirelessly or through wired connections. More specifically, the user may use a browser application on a computing device to access content on any of a number of webpages and websites hosted by one or more web servers.

Upon request, content related to a designated webpage may be downloaded to the user computing device, which may further render the webpage to be displayed. Such downloaded content may include a variety of different types of files, including documents, graphics, audio and video, etc., as well as related data (e.g., metadata, stylesheets including cascading stylesheets). The downloaded content may be stored in a browser cache in local memory of the computing device. Various elements and components of a particular webpage or website may change over time (e.g., as a publisher publishes new or updated content). Some components or elements, however, remain static and unchanged. When the user leaves the webpage and later wishes to return, the browser cache allows the computing device to retrieve static, unchanged files related to the associated webpage from local memory, rather than re-downloading the same web objects when a user wishes to revisit the webpage.

Currently, browsers do not contain or expose any unique identifiers that can be accessed and used by websites. Present websites and webpages may track and share data regarding the activity (e.g., repeat visits) of the user in relation to a particular webpage. Such data may include state information (e.g., preferences, shopping cart items), provide registration or authentication information (e.g., user names, passwords, addresses/locations), or otherwise track browsing history (e.g., which webpages were visited, a number of visits, when the visits occurred). Because nearly all aspects of modern life may be reflected in or otherwise involve Internet activity, however, some of the tracked data may be personally identifiable of a particular individual. Tracking mechanisms that encompass such personally identifiable data may therefore risk exposure of personal, confidential, and/or otherwise sensitive user information. In the interests of protecting user privacy, some jurisdictions may even have statutes or regulations restricting the type of data that may be tracked.

Meanwhile, various publishers, service providers, and related entities may be interested in obtaining statistical data regarding the user traffic that visits a given webpage or website. Although a web server may be able to identify a number of download requests for a particular webpage, such requests may be made by the same user (or the same small set of users). Such a metric may therefore fail to present an accurate picture of the traffic or user activity involving the website, while using the more particularized data discussed above may risk exposure of information that is personally identifiable of a specific user.

Moreover, users may use different browsers and visit a variety of different websites. Such variety can complicate the ability to track traffic where, for example, a user may use different browsers to visit the same website. Because such different browsers generally do not communicate or exchange information, it can be quite difficult to get a full picture of such a user may traffic the Internet.

There is, therefore, a need in the art for improved systems and methods for matching mutable browser identifiers to a browser and/or device.

SUMMARY OF THE CLAIMED INVENTION

Embodiments of the present invention allow for session-based matching of mutable browser identifiers. Information may be stored regarding a plurality of mutable browser identifiers each unique to an associated website and one or more maps each associating an immutable browser identifier to one or more mutable browser identifiers. Such an immutable browser identifier may be unique to an associated browser, whereas the mutable browser identifiers may be further unique to a particular website. Further, information may be received from a computing device that has used a browser to download a website. Such downloaded website may include a reference to a mutable browser identifier specific to the downloaded website. The referenced mutable browser identifier may be identified as corresponding to one of the stored mutable browser identifiers based on a comparison of session information of the referenced mutable browser identifier in the received information to the session information of the corresponding stored mutable browser identifier. Stored information associated with the corresponding stored mutable browser identifier may be updated.

Various embodiments may include methods for session-based matching of mutable browser identifiers. Such methods may include storing information in memory regarding a plurality of mutable browser identifiers each unique to an associated website and one or more maps each associating an immutable browser identifier with one or more mutable browser identifiers. Additional steps may include receiving information from a computing device that has used a browser to download a website that includes a reference to a mutable browser identifier specific to the downloaded website, identifying that the referenced mutable browser identifier corresponds to one of the stored mutable browser identifiers based on comparison of the session information of the referenced mutable browser identifier in the received information to the session information of the corresponding stored mutable browser identifier, and mapping the referenced mutable browser identifier to the corresponding stored mutable browser identifier.

Additional embodiments may include server systems for session-based matching of mutable browser identifiers. Such systems may include memory that stores information in memory regarding a plurality of mutable browser identifiers each unique to an associated website and one or more maps each associating an immutable browser identifier with one or more mutable browser identifiers, a communication interface that receives information from a computing device that has used a browser to download a website that includes a reference to a mutable browser identifier specific to the downloaded website, and a processor that executes instructions to identify that the referenced mutable browser identifier corresponds to one of the stored mutable browser identifiers based on a comparison of session information of the referenced mutable browser identifier in the received information to the session information of the corresponding stored mutable browser identifier, and to map the referenced mutable browser identifier the corresponding stored mutable browser identifier.

Further embodiments include non-transitory computer-readable storage media having embodied thereon a program executable by a processor to perform a method for session-based matching of mutable browser identifiers as described above.

DETAILED DESCRIPTION

Embodiments of the present invention allow for session-based matching of mutable browser identifiers. Information may be stored regarding a plurality of mutable browser identifiers each unique to an associated website and one or more maps each associating an immutable browser identifier to one or more mutable browser identifiers. Such an immutable browser identifier may be unique to an associated browser. Further, information may be received from a computing device that has used a browser to download a website. Such downloaded website may include a reference to a mutable browser identifier specific to the downloaded website. The referenced mutable browser identifier may be identified as corresponding to one of the stored mutable browser identifiers based on a comparison of session information of the referenced mutable browser identifier in the received information to session information of the corresponding stored mutable browser identifier. Stored information associated with the corresponding stored mutable browser identifier may be updated to map to the referenced mutable browser identifier.

Figure 1:
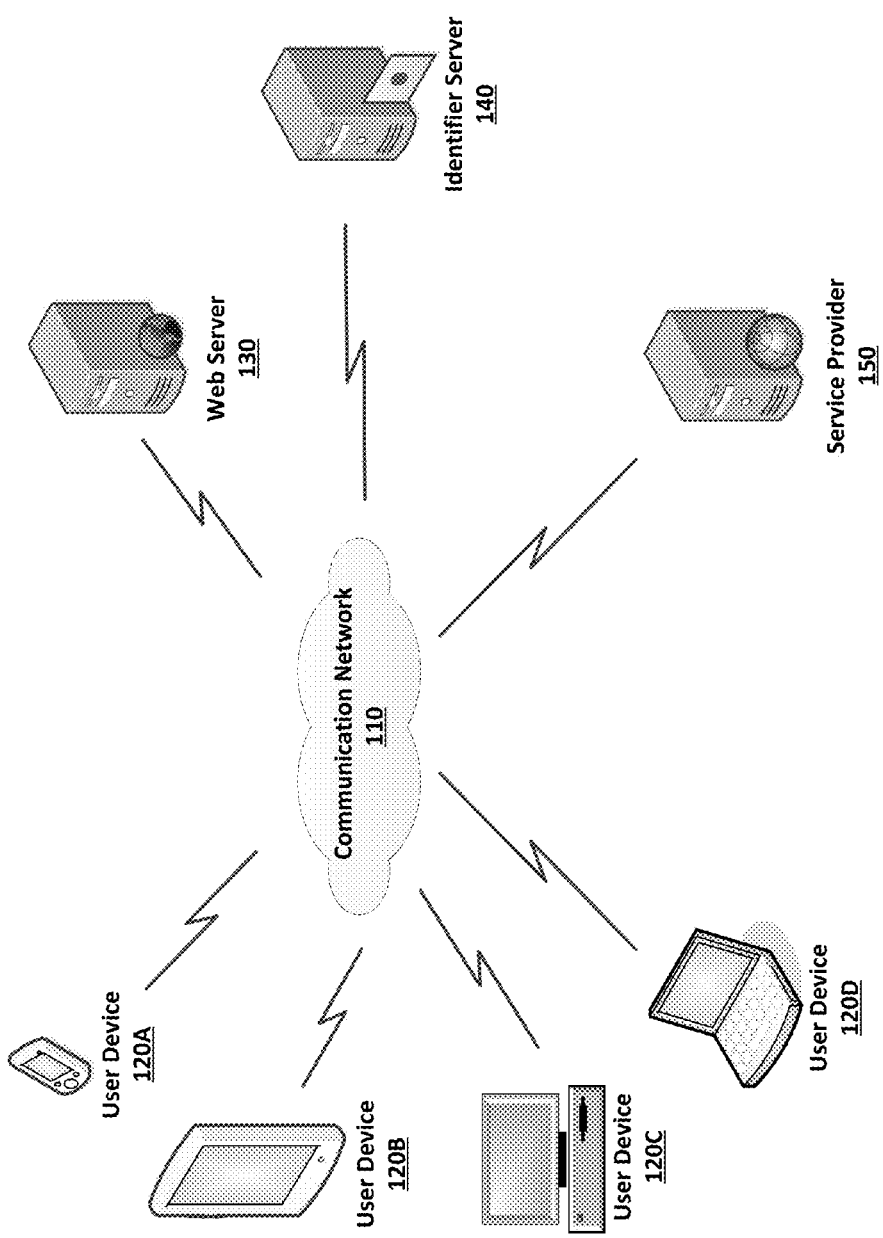
FIG. 1 illustrates an exemplary network environment in which a system for session-based matching of mutable browser identifiers may be implemented.

FIG. 1 illustrates a network environment 100 in which a system for matching mutable browser identifiers may be implemented. Network environment 100 may include a communication network 110, one or more user devices 120A-D, web server 130, identifier server 140, and one or more service providers 150. Devices in network environment 100 may communicate with each other via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, cellular or mobile service providers, a cable service provider, a provider of digital subscriber line (DSL) services, or a satellite service provider. Communications network 110 allows for communication between the various components of network environment 100.

Users may use any number of different electronic user devices 120A-D, such as general purpose computers, mobile phones, smartphones, smartwatches, wearable devices, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as local caches, memory cards, or disk drives as may be appropriate in the case of downloaded services. User device 120 may include standard hardware computing components such as network and media interfaces, non-transitory computer-readable storage (memory), and processors for executing instructions that may be stored in memory.

In addition, user devices 120 may include a variety of applications, including browser applications that allow the user to request certain webpages. For example, a user may enter a uniform resource locator (URL) into a browser application. Such a browser may send such request to an associated web server (e.g., web server 130), receive responsive data (e.g., webpage file with references to other files to download), and use such responsive data to render and display the requested webpage. Webpage files that may be downloaded to the user device 120 may include not only files corresponding to content that is actually displayed as part of the webpage, but also associated files.

Web server 130, identifier server 140, and service providers 150 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Web server 130 may be any kind of server used to host web content, including any type of webpage or website data. The particular files associated with each website may be controlled by a publisher (or designated administrator). The website file may include links to files under control by other parties. In that regard, the website files downloaded from web server 130 may include a reference (e.g., URL) to a mutable browser identifier file, as well as an optional loader application (e.g., Javascript commands) and associated code library to be used with the mutable browser identifier file. Such mutable browser identifier file may be specific to the website. For example, a mutable browser identifier for a particular website may include or otherwise be based on a domain (or other characteristic) of that website. As such, each website visited by a particular user device may be associated with a unique and different mutable browser identifier.

Such mutable browser identifier may be generated and managed in manners similar to those disclosed with respect to the browser identifiers disclosed in related co-pending U.S. patent application Ser. No. 14/716,187, the disclosure of which has been incorporated by reference herein. Moreover, the mutable browser identifiers disclosed herein may be used in conjunction with the disclosed invention of related U.S. patent application Ser. No. 14/716,187. As indicated by their respective names, an immutable browser identifier does not change, while a mutable browser identifier may change. An immutable browser identifier may be associated or mapped to different mutable browser identifiers. Because a mutable browser identifier may change, various indicators associated with a referenced mutable browser identifier may be used to map that referenced browser identifier to the immutable browser identifier, its associated mutable browser identifiers, and/or an associated device identifier.

In that regard, the browser may attempt to access the referenced mutable browser identifier file, either automatically or under direction of the loader application as executed by the user device 120. Such access may include automatically checking a local browser cache to determine whether the referenced mutable browser identifier file may have already been downloaded previously.

Following such checking of the local browser cache, the user device 120 may send a request to an identifier server 140 associated with the referenced mutable browser identifier file. Such request may be indicative of whether the referenced mutable browser identifier file was found in the local browser cache (and if so, when the referenced mutable browser identifier file had last been modified). Where the request indicates that the referenced mutable browser identifier file was not found in the local browser cache, the identifier server 140 may respond by sending a new mutable browser identifier file to the user device 120. As noted above, the new mutable browser identifier may be generated so as to be unique to the particular website being downloaded (e.g., based on website domain or other characteristic).

In that regard, the identifier server 140 may generate and provide a new unique mutable browser identifier upon request. Such a unique mutable browser identifier may be specific to the website making the request. Where the user may have opted out, however, a non-unique term may be inserted in place of the unique mutable browser identifier. In some embodiments, the user may opt out of being provided with unique identifiers with respect to a designated webpage or website. Alternatively, the user may opt into being provided with unique identifiers with respect to a designated webpage or website. As such, the website may be uniquely identified via the unique mutable browser identifier for some webpages, but not others. In some embodiments, such information regarding user opt-outs or opt-ins may be reflected in the mutable browser identifier file. For example, the mutable browser identifier file may include information indicative of the user opt-in or opt-out for defined webpages, websites, or categories of websites, as well as indicators specifying the granular details under which the opt-in or opt-out are to be implemented.

The user may also opt to reset the unique mutable browser identifier associated with the website. Resetting the unique mutable browser identifier may involve clearing the local browser cache of any previously downloaded mutable browser identifier files, generating a new mutable browser identifier (in a new mutable browser identifier file), and providing the new mutable browser identifier file, which may then be cached in the local browser cache. In some embodiments, a signal may be sent to the identifier server 140 to indicate that the mutable browser identifier file needs to be updated. Such a signal may be implemented in a cookie that the identifier server 140 can read and then determine what to send back as the mutable browser identifier file. Alternatively, the request (including pass information or parameters) may be directed to a transient URL (e.g., that is structured to include the mutable browser identifier and any directives), and that request may then be redirected to the identifier server 140, which can then look at the referrer header (e.g., transient URL) of the request to parse out the requested changes to the mutable browser identifier file.

Further, the identifier server 140 may provide a plurality of mutable browser identifiers (each to a different website and provided in a different mutable browser identifier file). Activity at the user device 120 in relation to the website may thereafter be associated with the provided unique mutable browser identifier. Such mutable browser identifier may further be associated with immutable browser and/or device identifiers, thereby allowing for the ability to distinguish between different browsers on the same or different computing devices in some cases. Specifically, information may be logged regarding activity at a particular website (as identified by a unique mutable browser identifier), which may be provided to identifier server 140 (or an associated server) by a loader application at the user device 120. In that regard, the identifier server 140 may not receive the mutable browser identifier itself, as the mutable browser identifier may only be called by local applications or code (e.g., browser, loader application, local code library) resident on the user device 120. The loader application may be executed to perform a variety of functions, which may include loading and executing code from the code library. Such a code library may be provided, modified, and updated at the web server 130, identifier server 140, or other designated service provider 150.

Where the referenced mutable browser identifier file was indeed found in the local browser cache, the browser may send a request with an indicator (e.g., a "if-modified-since" header) regarding the referenced mutable browser identifier file to the identifier server 140. The identifier server 140 may then determine whether an updated version of the referenced mutable browser identifier file should be sent based on information provided in the request (e.g., whether or not a "if-modified-since" header exists for the referenced mutable browser identifier file) or associated cookies, referrer headers, etc. If the referenced mutable browser identifier file is determined to be in the local browser cache (e.g., as indicated by the existence of an associated "if-modified-since" header in the request), the identifier server 140 may validate the file and send an indicator (e.g., a "304 not modified" indicator) regarding such validation. In some embodiments, such validation may extend a maximum age or expiration date/term of the referenced mutable browser identifier file, whereby the referenced mutable browser identifier file may be maintained an extended period of time (corresponding to the extended maximum age or expiration date/term) in the local browser cache. Where the user may have opted out (e.g., as indicated by an opt-out cookie), however, the identifier server 140 may return a mutable browser identifier file with a non-unique mutable browser identifier or an opt-out identifier.

The browser may not necessarily request that the identifier server 140 validate the referenced mutable browser identifier file in some instances. In such instances, the browser may use the cached mutable browser identifier file without making any request to the identifier server 140.

In some cases, the referenced mutable browser identifier file may be determined to require an update. For example, a cookie without an "if-modified-since" header may indicate that the referenced mutable browser identifier file had previously been present but is no longer found (in whole or in part) in the local browser cache. Upon determining that such modification may have occurred (e.g., as indicated by a header or other indicator in the request), the identifier server 140 may recreate the referenced website file or send a new mutable browser identifier file to the user device 120. While the foregoing refers primarily to modification headers, any type of cache control headers (or any type of cache control commands) known in the art may be used. Cache control may involve any operation involving cache memory, including directing validation and adjusting maximum ages as desired, as well as control where the mutable browser identifier file is cached (e.g., specify local browser cache).

A mutable browser identifier file may be any type of file that may be cached in local browser cache memory, including stylesheets, JavaScript files, HTML files, text files, AJAX requests, image files, etc. Such mutable browser identifier file may allow for its content (including the mutable browser identifier, whether unique or non-unique) to be accessible to the browser and related browser applications (including a loader application). As such, the browser and related browser applications may access and use the mutable browser identifier for various operations, including logging activity.

A mutable browser identifier file may include a mutable browser identifier, which may be unique to the webpage. In some cases, the user may opt out of being provided with a unique mutable browser identifier. In such cases, a new mutable browser identifier file may be generated with a non-unique term as the mutable browser identifier. Alternatively, the mutable browser identifier file may be updated to replace the unique identifier with a non-unique term (or an opt-out identifier for defined or general opt-out).

In some embodiments, the mutable browser identifier file may further include other types of information regarding user preferences (as designated by the user), including information regarding user opt-outs or opt-ins for specific webpages. As the user changes their opt-out or opt-in settings, such information may be used to update a mutable browser identifier file. The browser may then be directed to reload the mutable browser identifier file into the local browser cache, thereby implementing the updated user settings.

The identifier server 140 may further be able to match mutable browser identifiers to a common immutable browser identifier and in some cases, to a common device identifier. In this regard, a particular user device 120 (as identified by a device identifier) may be associated with one or more browsers (as identified by a respective immutable browser identifier), each of which may be associated with one or more websites (as identified by a respective mutable browser identifier). The identifier server 140 may therefore be capable of identifying one or more such identifiers (whether website, browser, or device) when a user device requests a website using particular browser, as well as maintaining and updating maps regarding which identifiers are associated with each other.

The identifier server 140 may use various indicators to create and update such maps. For example, secure sessions (e.g., secure socket layer (SSL) sessions) may allow for session resumption, which occurs where a client and server negotiates SSL information and then later reuses that negotiated SSL information for future connections. SSL session setup is generally very time-consuming, so not having to renegotiate is therefore desirable. In order to resume a session, a client must be able to identify the session. SSL session IDs and TLS session tickets are two mechanisms that allow for the identification and resumption of a previous session.

The identifier server 140 may be called when a browser visits websites with certain scripts (e.g., that call on the domain of the identifier server 140). The identifier server 140 may therefore be able to receive session resumption data when a particular website is accessed. As such, such identifier server 140 may use such session information to determine when multiple connections are using the same session as indicated, for example, by the same SSL session ID. Thus, the identifier server 140 can then map browser IDs associated with the multiple connections together. Such a map constructed by the identifier server 140 allows for creation of a persistent set of indicators that can be used to recognize a browser even when there is not existing SSL session.

Additional indicators may be based on use of transmission control protocol (TCP) information. TCP is used by a variety of Internet-based applications, including web browsers, email, and other applications. Information associated with use of TCP by a particular device (e.g., present in a TCP packet) may be inclusive or indicative of various timestamp information, such as current time, uptime, and clock skew. In an exemplary embodiment, the identifier server 140 may receive a browser identifier (e.g., associated with TCP timestamp information, such as a particular current time, uptime, source IP address, clock skew), determine whether the associated timestamp information (e.g., uptime) matches any timestamp information previously associated with the browser identifier (and if not, update stored information regarding the browser identifier to include the associated timestamp information), determine whether the uptime (or source IP address or clock skew) maps to any device identifiers, and if so, mapping the device identifiers together.

While current time are generally included in the TCP packet, further calculations may also be applied to obtain other timestamp information (e.g., uptime and clock skew). Uptime, for example, provides a measure of time since a computing device was started and continuously working. Especially when combined with other indicators (e.g., source IP address, clock skew), the uptime may be able to uniquely identify a particular device for the duration of time before the computing device is restarted. With respect to uptime, a device may record and report a number of ticks since the last time the device was started or the number of ticks was reset. That number of ticks may reset based on different schedules for different computing devices (e.g., some devices reset every few days and others reset every few weeks). A tick may also represent a different amount of time for different systems, so there may be some device-specific calculations involved to determine how much time is represented by the reported number of ticks. The result is a time that is incrementing consistently. Calculating that backwards provides the uptime, which may be the time the device was last started or the last time the number of ticks was reset. As such, the uptime generally remains the same even as ticks increase, until such time that the uptime is reset.

Such indicators used by identifier server 140 may therefore include session identifiers (e.g., transport layer security (TLS), secure sockets layer (SSL)), transmission control protocol (TCP) identifiers (e.g., uptime, current time, clock skew), internet protocol (IP) address, user agent identifiers, and others. Such indicators may be used individually or in any combination (e.g., SSL session identifier and TCP timestamp) to identify a particular common browser and/or a particular user device 120 based on common matches. An exemplary embodiment may select a certain set of indicators based on their respective deterministic value in identifying connections between identifiers for different browsers or devices. For example, a SSL session identifier is unique to the particular session and can therefore be used to map and associate different mutable browser identifiers for the same browser together. Likewise, the combination of current time, uptime, clock skew, and source IP address is unique to a particular device, thereby allowing for connections to be drawn between different device identifiers associated with the device.

For example, a particular request to download website may refer to a mutable browser identifier that is associated with one or more indicators (e.g., SSL session identifier). Such SSL session identifier may be compared to stored information and determined by identifier server 140 as having been previously used in conjunction with a different mutable browser identifier, with an immutable browser identifier, and/or with a device identifier. Likewise, a TCP timestamp associated with the requesting computing device may be determined by identifier server 140 as having been previously mapped or used in conjunction with other mutable browser identifiers, with an immutable browser identifier, and/or with a device identifier.

Where no stored map existed for the referenced mutable browser identifier (or any of its associated indicators or identifiers), a new map may be created. Where a stored map does exist, such stored map may be updated. As such, maps having one or more of these identifiers may be created and updated based on newly incoming identifiers (associated with certain indicators) and matches with stored identifiers (associated with the same or different indicators). When the identifier server 140 finds that two different mutable browser identifiers have the same indicator (e.g., SSL session identifier), for example, the identifier server 140 may determine that the respective website are using the same browser. The lifespans, availability, and deterministic value of each indicator may vary across different browsers, user agents, and/or operating systems. As such, indicators may be used in combination to increase the likelihood of finding a match, as well as the level of confidence in such matches.

In some embodiments, the identifier server 140 may be able to determine that a request is associated with a particular browser and website (as identified by a mutable browser identifier). Instead of a "304 not modified" indicator, the identifier server 140 may return a "200 request fulfilled" indicator with a new mutable browser identifier, which may be stored by the identifier server 140 in association with or mapped to the original browser identifier. Such a scheme therefore provides for mutability of the mutable browser identifier, while maintaining its association with various other identifiers (e.g., device and immutable browser identifiers).

In some embodiments, a first party cookie may be used as the persistent identifier (e.g., mutable browser identifier) for each website. Although a cookie may persist for a time, such cookie may be changed periodically. Thereafter, various matching parameters (e.g., SSL and uptime) may be used to identify and to map associated cookies together as described in further detail below. In that regard, the identifier server 140 should be understood as having the ability to use any persistent identifier to map to other persistent identifiers.

Over time, therefore, the map constructed by the identifier server 140 may grow to incorporate new connections and associations between various identifiers.

Service providers 150 may include servers or other computing devices that may provide various services based on identification of a browser. For example, a service provider 140 may use information regarding repeat visits to provide targeted advertising to repeat visitors (versus first-time visitors).

Figure 2:
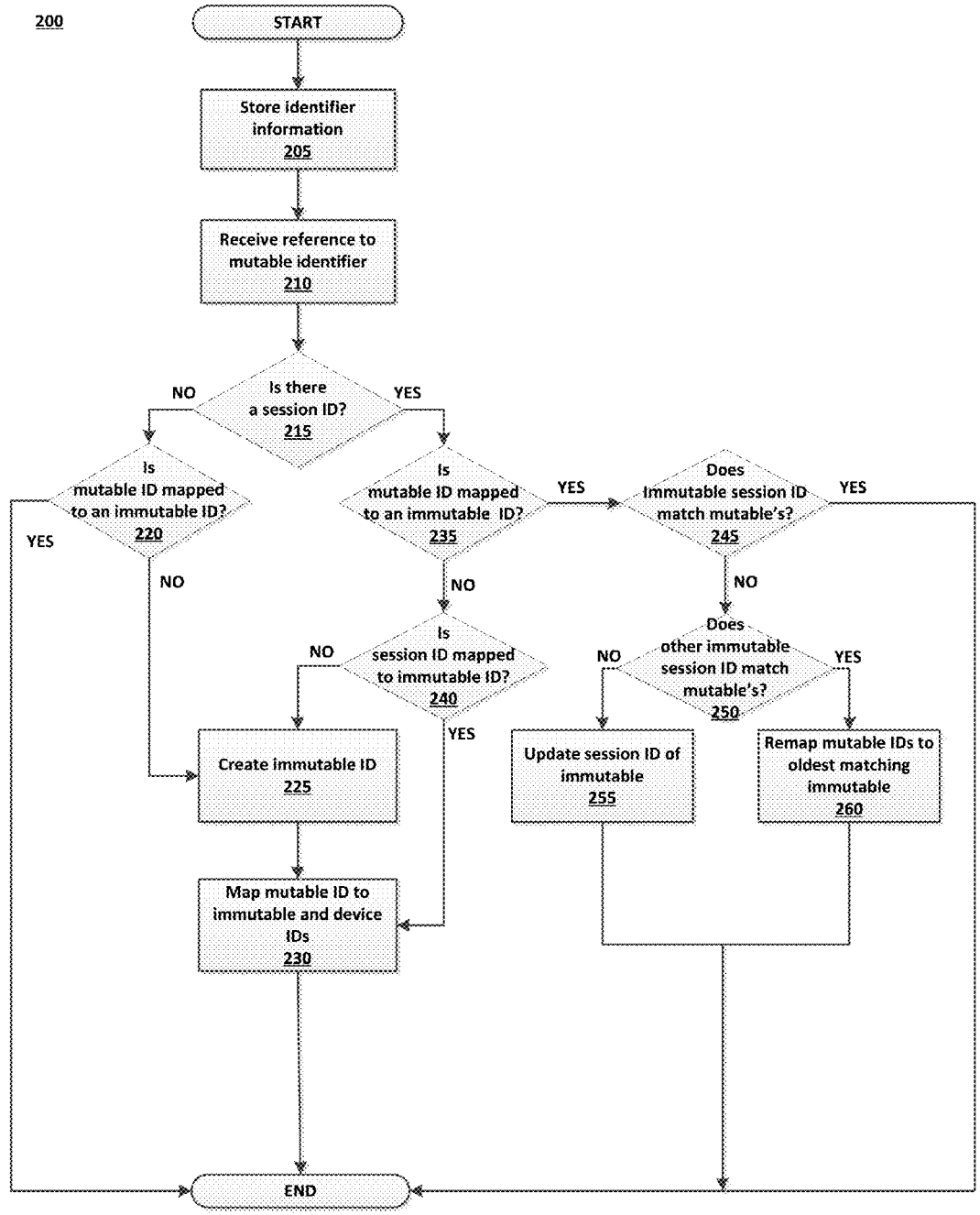
FIG. 2 is a flowchart illustrating an exemplary method for session-based matching of mutable browser identifiers.

FIG. 2 is a flowchart illustrating an exemplary method 200 for session-based matching of mutable browser identifiers. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, identifier information may be stored in memory of an identifier server 140, a reference to a mutable browser identifier may be received, and it may be determined whether there is a session identifier associated with the referenced mutable browser identifier. If not, the method may proceed to determine whether the referenced mutable browser identifier is mapped to an immutable browser identifier, and if not, an immutable browser identifier (and device identifier) may be created and mapped to the referenced mutable browser identifier. Alternatively, the referenced mutable browser identifier may also be matched to one or more other identifiers (e.g., device, browser, and/or websites). Stored information associated with the corresponding stored mutable browser identifier may be updated based on comparing the referenced mutable browser identifier (and its associated information) with stored identifier information (including maps of associated identifiers).

In step 205, identifier information may be stored in memory of an identifier server 140. The stored information may include multiple different mutable browser identifiers, immutable browser identifiers, and device identifiers, as well as maps correlating one or more such identifiers. For example, a map may associate a particular device identifier with one or more immutable browser identifiers and mutable browser identifiers. Such maps may have been generated based on previously received information regarding such associations (e.g., previously received mutable browser identifiers mapped to a particular common immutable browser identifier), as well as updated over time. Such updates may include not only creating new associations based on newly received association data, but also updating stored associations based on any matches to the newly received information.

In step 210, a request for a particular website (e.g., as identified by a URL) may be entered by the user via a browser of a user device 120, which may send such request to the web server 130 associated with the website. The web server 130 provides website content to the browser of user device 120. Such website content may be associated with the reference to a mutable browser identifier file. Such a reference may be another URL that resolves to identifier server 140. In some embodiments, the reference sent by the web server 140 may pertain to a loader application that is executable to reference the mutable browser identifier file.

The browser may check a local browser cache to find the referenced mutable browser identifier file.

In step 215, it is determined whether a session identifier (e.g., SSL session identifier) is associated with the request received in step 210. If not, the method proceeds to step 220, and if yes, the method proceeds to step 235.

In step 220, it is determined whether the referenced mutable browser identifier is already mapped to an immutable browser identifier. Such determination may be based on the stored maps in memory of the identifier server 140. If so, the method ends. If not, the method may proceed to step 225.

In step 225, an immutable browser identifier is created. Such an immutable browser identifier may be created and managed in manners corresponding to those disclosed in related co-pending U.S. patent application Ser. No. 14/716,187.

In step 230, the referenced mutable browser identifier is mapped to the immutable browser identifier. Further, in some embodiments, a device identifier may also be created and mapped to the immutable browser identifier and the referenced mutable browser identifier.

In step 235, it is determined whether the referenced mutable browser identifier can be mapped to an immutable browser identifier. Such step may be performed in a manner similar to step 220. Here, however, if the referenced mutable browser identifier cannot be mapped to an immutable browser identifier, the method may proceed to step 240. On the other hand, if the referenced mutable browser identifier can be mapped to an immutable browser identifier, the method may proceed to step 245.

In step 240, it is determined whether the session identifier found in the same request as the referenced mutable browser identifier can be mapped to a stored immutable browser identifier. If not, the method may proceed to step 225 (in which the immutable browser identifier is created) before proceeding to step 230 (in which the referenced mutable browser identifier is mapped to the immutable browser identifier). If the session identifier found in the same request as the referenced mutable browser identifier can be mapped to a stored immutable browser identifier, however, the method may proceed directly to step 230.

In step 245, it is determined whether a session identifier associated with the mapped immutable browser identifier matches the session identifier received in the same request as the referenced mutable browser identifier. If there is a match, the method ends. If there is no match, the method may proceed to step 250.

In step 250, it is determined whether there is another immutable browser identifier (e.g., of all the immutable browser identifiers stored at the identifier server 140) that is associated with a session identifier matching that of the referenced mutable browser identifier. If not, the method proceeds to step 255, and if so, the method proceeds to step 260.

In step 255, stored information regarding the immutable browser identifier is updated to reflect the session identifier of the referenced mutable browser identifier. As noted above, some indicators may have short lifespan, and a session identifier may have expired and/or been replaced, thereby resulting in the referenced mutable browser identifier being associated with a different session identifier than the immutable browser identifier. Because the referenced mutable browser identifier is determined to have been mapped to a stored immutable browser identifier (step 235), however, the session identifier of that referenced mutable browser identifier may therefore be associated with the stored immutable browser identifier as well.

In step 260, the stored maps may be updated to remap the referenced mutable browser identifier (as well as any other mutable browser identifiers associated with the immutable browser identifier found in step 235) to the other immutable browser identifier based on the matching session identifier. In some embodiments, remapping may be based on which immutable browser identifier is older. Other embodiments may include remapping based on other factors, such as number of associated mutable browser identifiers.

Figure 3:
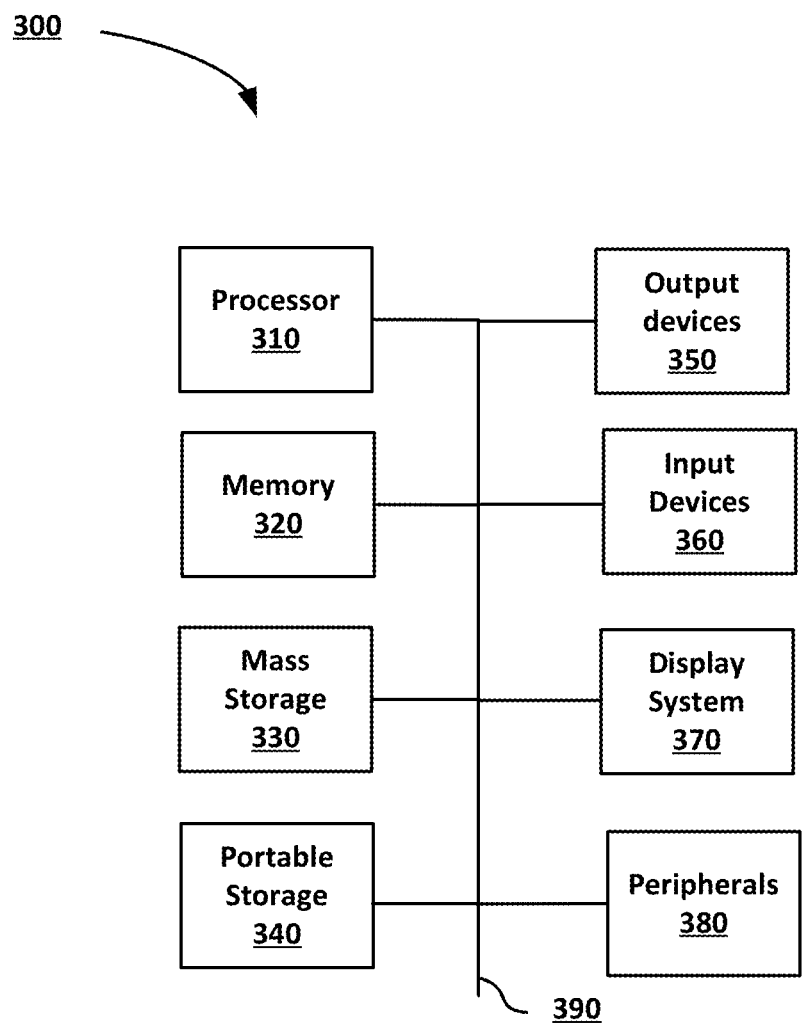
FIG. 3 illustrates an exemplary computing system that may be used to implement an embodiment of the present invention

FIG. 3 illustrates an exemplary computing system 300 that may be used to implement an embodiment of the present invention. System 300 of FIG. 3 may be implemented in the contexts of the likes of user devices 120A-D, web server 130, identifier server 140, and service provider 150. The computing system 300 of FIG. 3 includes one or more processors 310 and memory 310. Main memory 310 stores, in part, instructions and data for execution by processor 310. Main memory 310 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus 390, and the mass storage device 330, peripheral device(s) 380, portable storage device 340, and display system 370 may be connected via one or more input/output (I/O) buses 390.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk (CD) or digital video disc (DVD), to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus (e.g., bus 390) carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for session-based matching of mutable browser identifiers, the method comprising:
storing information in memory regarding:
a plurality of mutable browser identifiers, each mutable browser identifier having been generated to be unique to a different associated website, wherein a corresponding mutable browser identifier has been provided to a local cache, and wherein a new mutable browser identifier unique to the associated website is generated upon request and provided to the local cache, and
one or more maps, wherein each map associates a different immutable browser identifier with one or more of the mutable browser identifiers, the immutable browser identifier unique to a different browser in use at an associated computing device;
receiving information from a computing device that has used a browser during a session to download a website, wherein the downloaded website includes a reference to a mutable browser identifier specific to the downloaded website;
identifying that the referenced mutable browser identifier corresponds to one of the stored mutable browser identifiers based on a comparison of session information for the session in the received information to session information associated with the corresponding stored mutable browser identifier; and
mapping the referenced mutable browser identifier to the corresponding stored mutable browser identifier based on a match between the session information for the session and the session information associated with the corresponding stored mutable browser identifier.

2. The method of claim 1, wherein the session information includes at least one of a secure socket layer (SSL) session identifier, a transport layer security (TLS) session identifier, a TLS session ticket, or another identifier that allows for resumption and reuse of a previously-negotiated SSL/TLS session.

3. The method of claim 1, wherein the corresponding stored mutable browser identifier is associated with a corresponding immutable browser identifier in accordance with the one of the stored maps.

4. The method of claim 3, wherein the associated immutable browser identifier is associated with a stored session identifier different from a received session identifier associated with the referenced mutable browser identifier, and further comprising determining whether there is another stored session identifier that matches the received session identifier associated with the referenced mutable browser identifier.

5. The method of claim 4, wherein there is another stored session identifier that matches the received session identifier, and wherein updating the map associated with the corresponding stored mutable browser identifier comprises remapping the corresponding stored mutable browser identifier based on the matching session identifier.

6. The method of claim 5, wherein remapping the corresponding stored mutable browser identifier comprises associating the corresponding stored mutable browser identifier with another immutable browser identifier associated with the matching session identifier.

7. The method of claim 1, wherein the corresponding stored mutable browser identifier is not associated with any stored immutable browser identifier in accordance with any of the stored maps, and further comprising determining whether there is stored session identifier that matches a session identifier associated with the referenced mutable browser identifier.

8. The method of claim 7, wherein there is a stored session identifier that matches the session identifier associated with the referenced mutable browser identifier, the stored session identifier associated with a stored immutable browser identifier, and wherein mapping the mutable browser identifier to the corresponding stored mutable browser identifier further comprises mapping the corresponding stored mutable browser identifier to the stored immutable browser identifier associated with the matching stored session identifier.

9. The method of claim 7, wherein there is no stored session identifier that matches the session identifier associated with the referenced mutable browser identifier, and further comprising:
creating an immutable browser identifier; and mapping the corresponding stored mutable browser identifier to the created immutable browser identifier.

10. The method of claim 1, wherein updating information associated with the corresponding stored mutable browser identifier comprises further mapping the corresponding stored mutable browser identifier to a device identifier, and wherein the device identifier is unique to the computing device.

11. A server system for session-based matching of mutable browser identifiers, the system comprising:
  memory that stores information regarding:
    a plurality of mutable browser identifiers, each mutable browser identifier having been generated to be unique to a different associated website, wherein a corresponding mutable browser identifier has been provided to a local cache, and wherein a new mutable browser identifier unique to the associated website is generated upon request and provided to the local cache, and
    one or more maps, wherein each map associates a different immutable browser identifier with one or more of the mutable browser identifiers, the immutable browser identifier unique to a different browser in use at an associated computing device;
  a communication interface that receives information from a computing device that has used a browser during a session to download a website, wherein the downloaded website includes a reference to a mutable browser identifier specific to the downloaded website; and
  a processor that executes instructions stored in memory, wherein execution of the instructions by a processor:
    identifies that the referenced mutable browser identifier corresponds to one of the stored mutable browser identifiers based on a comparison of session information for the session in the received information to session information associated with the corresponding stored mutable browser identifier, and
    maps the referenced mutable browser identifier to the corresponding stored mutable browser identifier based on a match between the session information for the session and the session information associated with the corresponding stored mutable browser identifier.

12. The system of claim 11, wherein the session information includes at least one of a secure socket layer (SSL) session identifier, a transport layer security (TLS) session identifier, a TLS session ticket, or another identifier that allows for resumption and reuse of a previously-negotiated SSL/TLS session.

13. The system of claim 11, wherein the corresponding stored mutable browser identifier is associated with an immutable browser identifier in accordance with one of the stored maps.

14. The system of claim 13, wherein the associated immutable browser identifier is associated with a stored session identifier different from a received session identifier associated with the referenced mutable browser identifier, and wherein the processor executes further instructions to determine whether there is another stored session identifier that matches the received session identifier associated with the referenced mutable browser identifier.

15. The system of claim 14, wherein there is another stored session identifier that matches the received session identifier, and wherein the processor updates the map associated with the corresponding stored mutable browser identifier by remapping the corresponding stored mutable browser identifier based on the matching session identifier.

16. The system of claim 14, wherein the processor remaps the corresponding stored mutable browser identifier comprises associating the corresponding stored mutable browser identifier with another immutable browser identifier associated with the matching session identifier.

17. The system of claim 11, wherein the corresponding stored mutable browser identifier is not associated with any stored immutable browser identifier in accordance with any of the stored maps, and wherein the processor executes further instructions to determine whether there is stored session identifier that matches a session identifier associated with the referenced mutable browser identifier.

18. The system of claim 17, wherein there is a stored session identifier that matches the session identifier associated with the referenced mutable browser identifier, the stored session identifier associated with a stored immutable browser identifier, and wherein the processor maps the referenced mutable browser identifier to the corresponding stored mutable browser identifier by mapping the corresponding stored mutable browser identifier to the stored immutable browser identifier associated with the matching stored session identifier.

19. The system of claim 17, wherein there is no stored session identifier that matches the session identifier associated with the referenced mutable browser identifier, and wherein the processor executes further instructions to:
  create a immutable browser identifier; and
  map the corresponding stored mutable browser identifier to the created immutable browser identifier.

20. The system of claim 11, wherein the processor updates information associated with the corresponding stored mutable browser identifier by further mapping the corresponding stored mutable browser identifier to a device identifier, and wherein the device identifier is unique to the computing device.

21. A non-transitory computer-readable storage medium, having embodied thereon a program executable by a processor to perform a method for session-based matching of mutable browser identifiers, the method comprising:
  storing information regarding:
    a plurality of mutable browser identifiers, each mutable browser identifier having been generated to be unique to a different associated website, wherein a corresponding mutable browser identifier has been provided to a local cache, and wherein a new mutable browser identifier unique to the associated website is generated upon request and provided to the local cache, and
    one or more maps, wherein each map associates a different immutable browser identifier with one or more of the mutable browser identifiers, the immutable browser identifier unique to a different browser in use at an associated computing device;
  receiving information from a computing device that has used a browser during a session to download a website, wherein the downloaded website includes a reference to a mutable browser identifier specific to the downloaded website;
  identifying that the referenced mutable browser identifier corresponds to one of the stored mutable browser identifiers based on a comparison of session information for the session in the received information to session information associated with the corresponding stored mutable browser identifier; and maps the referenced mutable browser identifier to the corresponding stored mutable browser identifier based on a match between the session information for the session and the session information associated with the corresponding stored mutable browser identifier.

* * * * *